United States Patent [19]

Paull et al.

[11] 4,003,987
[45] Jan. 18, 1977

[54] WASTE STREAM TREATMENT

[75] Inventors: Peter L. Paull, Weston, Conn.; James M. Caffrey, Jr., Wappingers Falls, N.Y.

[73] Assignee: Texaco Development Corporation, New York, N.Y.

[22] Filed: June 30, 1975

[21] Appl. No.: 591,744

[52] U.S. Cl. .............................. 423/570; 423/239; 423/244; 423/524

[51] Int. Cl.[2] ................. C01B 17/04; C01B 17/00; C01B 17/82

[58] Field of Search .......... 423/235, 239, 242, 244, 423/247, 523, 531, 570

[56] References Cited

UNITED STATES PATENTS

| | | | |
|---|---|---|---|
| 1,822,447 | 9/1931 | Merrian | 423/523 |
| 2,678,872 | 5/1954 | Kachkaroff et al. | 423/523 |
| 3,454,355 | 7/1969 | Ryason | 423/239 |
| 3,864,451 | 2/1975 | Lee et al. | 423/239 |
| 3,911,081 | 10/1975 | Maness et al. | 423/235 |

FOREIGN PATENTS OR APPLICATIONS

| | | | |
|---|---|---|---|
| 1,132,266 | 10/1968 | United Kingdom | 423/523 |

*Primary Examiner*—Earl C. Thomas
*Assistant Examiner*—Gary P. Straub
*Attorney, Agent, or Firm*—T. H. Whaley; C. G. Ries; Robert A. Kulason

[57] ABSTRACT

The effluent streams from utility stack gases containing nitric oxides and sulfur dioxide are entrained with sulfuric acid and carbon monoxide from refinery cracking and other industrial plants and in a sequence of separation and reaction steps nitrogen and carbon dioxide are vented to the atmosphere and regenerated concentrated sulfuric acid and sulfur produced.

6 Claims, 1 Drawing Figure

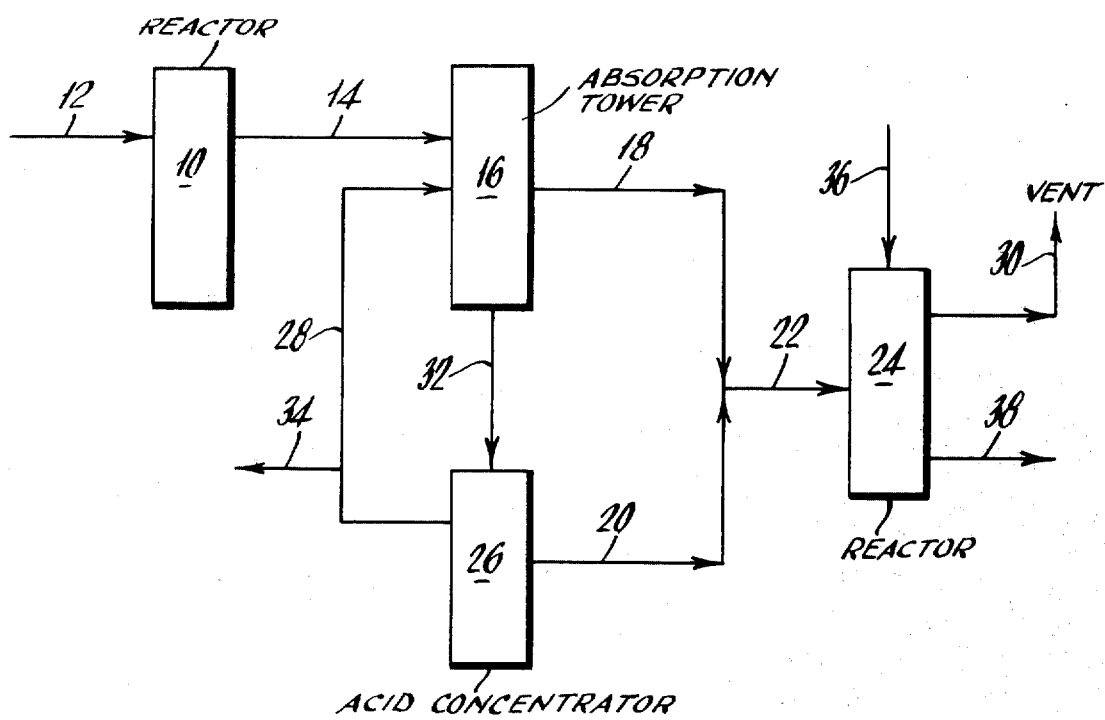

WASTE STREAM TREATMENT

BACKGROUND OF INVENTION

Present in petroleum refining complexes are fluid catalytic cracking regenerator systems yielding gases containing significant quantities, in the volumes produced, of carbon monoxide. Substantial amounts of carbon monoxide are also produced inter alia by separating carbon monoxide from synthesis gas, using a copper liquor absorbent, and from smelting operations.

At the same time and in operative proximity, for the purpose of the present invention, to refinery facilities including cracking and smelting operations of the like are often disposed utility plant facilities engaged in the production of energy using fossil fuels, particularly high sulfur petroleum residual fuels or coal, the effluent from which, as normally evidenced by the stack gases emanating from these facilities, contain noxious amounts and concentrations of sulfur dioxide and nitrogen oxides.

Efforts made to remove sulfur dioxide have involved heretofore, in one manifestation, the employment of basic aqueous solutions and slurries which tend to leave significant concentrations of $SO_2$ behind which then appear in the stack of flue gases, particularly where high sulfur residual petroleum fuels or coal are employed. However, unless complete removal of $SO_2$ is effected, ground-level concentrations of this pollutant will occur which may be only slightly better than those resulting from untreated flue gases.

The Tyco process has provided another means for removal of $SO_2$, and nitrogen oxides (NxOy) from stack gases, utilizing a modification of the chamber process, now obsolescent, wherein nitrosyl sulfuric acid ($HNSO_5$) is derived by the following reaction sequence:

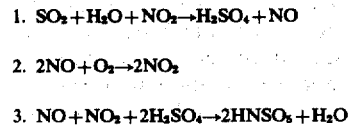

In these reactions $NO_2$ acts as a homogeneous catalyst; and whereas steps (1) and (2) occur simultaneously in the conventional chamber reaction they are undertaken separately in the Tyco process. It was found advantageous to have these reactions performed separately since reaction (1) occurs much more rapidly than reaction (2). Thus, in the Tyco process this reaction (2) is carried out separately after stripping an equimolar mixture of nitric oxide an nitrogen dioxide (or $N_2O_3$) from the nitrosyl sulfuric acid and cooling it. The excess $NO_2$ is converted to nitric acid in the typical Tyco process.

In the original embodiment of the Tyco process, $NO_2$ is introduced into flue gas to provide the reactant mixture of reaction (1) at 300° F. with consequent and complete oxidation of $SO_2$ in five seconds. Excess nitrogen oxides provide an oxidation level corresponding to $N_2O_3$.

In this original or baseline process the reaction gas is countercurrently contacted with $H_2SO_4$ of 80 wt. % concentration at 80° F. Gas from the absorber goes to the stack. The scrubber exit liquid is nitrosyl sulfuric acid dissolved in 76 wt. % $H_2SO_4$ at about 275° F. It is reconstituted to 80 wt. % sulfuric acid at 395° F. by hot combustion gas. Air oxidation converts the nitrogen oxides to $NO_2$ in a re-oxidation chamber, and part is removed as nitric acid. The remainder is introduced into flue gas. The latter is newly treated in conjunction with this recycled remainder.

One modification of this initial embodiment involves the use of cooling to separate water upstream of the absorber, but this too was deemed unattractive commercially.

A further modification is similar to that of the original process up to the absorption step. Absorption is, however, undertaken at an elevated temperature, i.e. about 250° F. and $N_2O_3$ is, as a result, recovered without condensation of water also present normally in the combustion or stack gases being treated. A solution of nitrosyl sulfuric acid in 80 wt. % acid concentration is filtered in this modification and passed to a catalytic reactor packed with charcoal, and is then passed countercurrently to air that strips and oxidizes the nitrogen oxides. Part of the $NO_2$ is absorbed as $HNO_3$ as in the earlier modifications, and the remainder also recycled as previously described.

The Tyco process thus involves basically a reliance on the recycling of nitrogen oxides to react with the effluent sulfur dioxide and water of reaction (1).

Indeed, conventionally as seen, the process requires the incorporation of nitric acid into reaction (1), a factor which tends to detract from the economic viability of the Tyco process.

Additionally, the Tyco process is not capable of accomplishing its espoused purpose in a single pass through, as indicated. Significantly, too, this process is capable normally of generating only dilute levels of sulfuric acid, rather than concentrated sulfuric acid and immediately useful, more readily shipped products, such as sulfur.

Various other experimental processes have also been developed for recovery of one or more of the other pollutants referred to hereinabove, that is, carbon monoxide, nitrogen oxides, and the like.

If, accordingly, the pollutants incorporated in flue gases and refinery effluent emission from power plants utilizing fossil fuels; from petroleum refinery operations and additionally, metallic ore smelters as well as other petroleum product sources, could be mutually entrained and subjected in large volume to an efficient process of absorption, separation and reaction in which the several pollutants were utilized to aid in recovery of significant industrial chemicals and the formation of innocuous effluent which could be let free in the surrounding atmosphere without significant concern for its pollutant effect, and without the required recycling of impurities, a valuable and economic method would be effected which would constitute a significant advance in the state of the art.

SUMMARY OF INVENTION

It is, therefore, a primary object of this invention to provide a novel method whereby the more noxious industrial effluents are utilized to produce industrially usable products and innocuous compositions that may be vented to the surrounding atmosphere without a material increase in the concentration of undesirable pollutants therein.

A further object of the invention is to provide a method for forming and regenerating from an admixture of noxious waste material marketable amounts of sulfur and, in addition, sulfuric acid of a purity sufficient to render it reuseable in the method with the excess being readily employable in other sulfuric acid consuming processes, while passing off into the atmosphere only such innocuous materials as carbon dioxide and nitrogen, some moisture, and mixtures thereof.

It is an additional object of this invention to provide a method for forming innocuous effluent and useful industrial chemicals which can process large volumes of noxious industrial effluent efficiently without recycling the impurities or requiring the addition to the process of useful industrial chemicals not inherent in the process.

Accordingly, it has now been discovered that concentrated sulfuric acid, sulfur, nitrogen and carbon dioxide can be recovered from a mixture of sulfur dioxide, nitrogen oxide and carbon monoxide, the foregoing materials being received as effluent from available refinery cracking and copper liquor absorbent units, smelting facilities, power plants and the like. The method has particular application as a continuous process.

BRIEF DESCRIPTION OF THE DRAWING

The FIGURE is a diagrammatic illustration of the method according to the invention.

DESCRIPTION OF THE PREFERRED EMBODIMENTS

The process of the present invention comprises initially contacting the hot emergent flue gases or other noxious effluent of similar compositions incorporating nitrogen oxides (and including some nitrogen dioxide), sulfur dioxide, oxygen and water with an oxidation catalyst and most desirably a "Leak alumina catalyst". This latter term is meant to encompass those catalytic structures comprising a substrate, for example, a metal mesh or metal wool, providing structural stability and broadly exposed surface, although not restricted in configuration or to use of any particular material, having an adherent film or layer of alumina, such as monohydrate alumina or preferably and predominantly gamma or eta alumina; and as the oxidation catalyst, metallic oxide including complexes thereof, wherein the metal is one selected from Groups Ib, VIa, VIIa, or VIII of the Periodic Table as set forth on the back cover of Cotton, F.A. et al *Advanced Inorganic chemistry* Interscience Publishers New York 1962 or, vanadium oxides, and combinations thereof; illustratively and preferably the metal oxides thereof including vanadium oxides, and most desirably, vanadium pentoxide; copper oxide and complexes thereof with, for example, copper chromite; chromium oxides; molybdenum oxides; tungsten oxides; manganese oxides; iron oxides; cobalt oxides; nickel oxides; and mixtures or other complexes thereof. Acceptable Leak alumina catalysts for use herein are further described in U.S. Pat. Nos. 3,231,520; 3,240,698; and 3,362,783. This initial contact of flue gases or the like with the foregoing Leak alumina oxidation catalyst is effected at an elevated temperature which while not narrowly critical is preferably within the range generally of about 300° to 350° F. using typical space velocity of between about 500 and 10,000 (vol. gas/vol. catalyst). The oxidation catalyst serves to convert substantially all of the nitrogen oxides into nitrogen dioxide. A portion of the sulfur dioxide present may also be converted into sulfur trioxide at this time.

The flue gases or gases of similar composition so modified are next contacted with sulfuric acid of between about 70 and 90 wt. %, preferably 80 to 90 wt. %, concentration, preferably by countercurrent contact one with the other at a temperature within the range of about 235° to 350° F., preferably about 250° F. Substantial amounts of the sulfur dioxide and nitrogen oxides, including substantially all of the sulfur trioxide, present are absorbed in the sulfuric acid. The quantity of water containing sulfuric acid employed should be at least the stoichiometric amount required to convert substantially the sulfur dioxide and trioxide to additional sulfuric acid and to convert the nitrogen oxides to nitrosyl sulfuric acid. Sulfuric acid concentrations substantially above 90 wt. % are undesirable because there is usually insufficient water present therein for satisfactory conversion of the sulfur dioxide and trioxide into sulfuric acid. Sulfuric acid concentrations below about 70 wt. % are not suitable since a product of such a dilution as to require costly concentration procedures thereon to render it saleable.

The unabsorbed flue gases containing the remainder of the sulfur dioxide and some nitrogen oxides are intermixed with a stream of carbon monoxide recovered normally from synthesis gas using a copper liquor absorbent; smelting operation as indicated hereinabove; or from other industrial waste fluids; and passed through a reactor also containing an oxidation catalyst, and preferably a Leak alumina catalyst, such as described hereinabove at a temperature within the range of about 300° to 450° F., preferably about 325° F. using space velocities of between about 500 and 10,000 vol. gas/vol. catalyst. The Leak alumina catalyst is, in the latter instance, preferably a copper oxide-copper chromite complex. The products resulting from the reaction so induced are sulfur, carbon dioxide, nitrogen and steam ($H_2O$). The carbon dioxide, nitrogen and water are vented harmlessly into the surrounding environment and the sulfur recovered is marketable as such. The amount of carbon monoxide employed should desirably be about the stoichiometric amount necessary to convert the sulfur dioxide to sulfur and the reactant carbon monoxide to carbon dioxide.

The sulfuric acid together with the nitrogen oxides, predominately NO together with some $NO_2$, also present, react to yield nitrosyl sulfuric acid. Sulfuric acid incorporating nitrosyl sulfuric acid, the free sulfuric acid remaining and any sulfur trioxide present, and absorbed sulfur dioxide as well as water, are heated to between about 300° and 500° F., to remove nitrogen oxides, to desorb $SO_2$, to volatilize water as overhead and thus to increase the sulfuric acid content. The reconstituted sulfuric acid is recycled to the absorption unit. The overhead is catalytically reacted with additional amounts of the undesired industrial effluent, in the manner aforedescribed in respect to the unabsorbed flue gases, to form nitrogen and carbon dioxide which, in accordance with a preferred embodiment of the present invention, are free from particulate matter when formed, and freely vented to the atmosphere without ill effect and form sulfur which is collected for marketing. Under preferred conditions, the overhead is combined with the unabsorbed flue gases and catalytically treated therewith.

The term, "nitrogen oxides" or "nitric oxides" as employed herein is intended to encompass compounds of the general formula, $N_xO_y$, referred to hereinabove, where $x$ is an integer of from 1 to 2 and $y$ is an integer having a value at least that of $x$ and within the range of 1 to 4 inclusive. Illustrative of the nitric oxides present in flue gases and other effluent sources treated by the present process are NO, $NO^-$, $N_2O_2$, $N_2O_3$ and $N_2O_4$.

Typically, the flue gas generated for the process of the invention where derived from a coal which contains, illustratively, the following weight percentages of the indicated components: carbon: 70.1; oxygen: 6.6; hydrogen: 4.9; nitrogen: 1.4; sulfur: 3.0; ash: 12.7; and moisture: 1.3. Where derived from a residual oil up to 5 wt. % sulfur; 85 wt. % carbon; and 10 wt. % hydrogen are present. The sulfur content of the coal or residual oil burns to about 98 wt. % sulfur dioxide and about 2 wt. % sulfur trioxide. The flue gas containing these oxides would most desirably be free of any ash content for the most efficient operation of the instant process and this is accomplished conveniently using conventional treatment means such as an electrostatic precipitator well known to those skilled in the relevent art. Normally, according to these known methods, the ash is removed from the flue gas prior to oxidation of the nitrogen oxides. Normally, the flue gas will contain 0.3% to 2.0% sulfur dioxide and 0.05% to 0.5% nitrogen oxides. The nitrogen oxides result from the combustion process and any nitrogen compounds in the fuel.

The terms "percentages" and "parts" and their grammatical equivalents as employed herein refer to percentages and parts by weight unless otherwise expressly indicated.

Carbon monoxide from the waste fluid sources recited hereinabove, is introduced, in large concentrations, into the process of the invention separately and in succeeding steps as described in detail hereinafter.

The deployment of these industrial waste fluids and the procedure whereby useful end-products are derived therefrom or dispersed as harmless and naturally occurring components in the surrounding atmosphere is shown by reference to the preferred embodiment appearing in the flow diagram of the accompanying FIGURE. The apparatus forming the individually enumerated units referred to therein are standard and well known to those skilled in the art to which this invention pertains.

Thus, as noted generally heretofore, the flue gases, which are employed by way of illustration in the description that follows leave the power plant or equivalent source at a temperature normally of about 900° F. These emergent gases are then preferably first passed through an electrostatic precipitator (not shown) where virtually all of the fly ash is removed so as to avoid contamination, and resulting diminution in effectiveness, of the catalyst bed employed in the catalyst oxidizer 10 of the succeeding step. The flue gas, illustratively, is conducted to the catalytic oxidizer 10 from the precipitator through line 12. The flue gas is a mixture, normally, of sulfur dioxide, nitrogen dioxide and nitric oxide together with nitrogen, carbon dioxide, water and oxygen. The catalytic oxidizer containing a Leak alumina catalyst disposed on a substrate of expanded surface dimensions, as described above, serves to convert substantially all of the nitrogen oxide content of the gas stream into nitrogen dioxide and a portion of the sulfur dioxide into sulfur trioxide. In practice, this passage through, and the conversion of flue gas in, the catalytic oxidizer is conducted at about 300° to 350° F. and preferably at about 300° F.

The flue gas, so modified is then transmitted by duct 14 so the absorption tower 16 wherein the flue gas is passed countercurrently through the sulfuric acid introduced into the process at this point.

While the temperature of the flue gas is not narrowly critical at its point of entry into the catalytic oxidizer 10, the gas should, and normally does, enter the absorber 16 at a temperature above its dew point to reduce corrosion of the absorber structure. The temperature of the hot flue gases is appreciably reduced in the absorber desirably to within the range of 235° to 350° F. by contact with the sulfuric acid, the temperature of which is in turn elevated.

The nitrogen dioxide, and a portion of the sulfur dioxide present in the flue gas are absorbed in the sulfuric acid also containing some sulfur dioxide and water. The sulfur dioxide and nitrogen dioxide absorbed from the flue gas are converted in part to sulfuric acid by the nitrogen dioxide with concomitant conversion of the nitrogen dioxide to nitric oxide. There is formed, in turn, by reaction of the nitrogen dioxide and nitric oxide with the sulfuric acid and water content formed, and already present in, the sulfuric acid, nitrosyl sulfuric acid in the manner defined generally in equations (1) and (3) hereinabove. Any $SO_3$ in the flue gas, after it leaves the oxidizing unit 10 is also normally absorbed in the sulfuric acid and converted to sulfuric acid as well upon reaction with the water content of the latter composition.

The sulfuric acid incorporating the foregoing absorption and reaction products is removed from the absorber 16 through conduit 32 and passed to acid concentrator 26 where the nitrosyl sulfuric acid is decomposed, and where the absorbed nitorgn oxides and absorbed traces of sulfur dioxide are desorbed. The decomposed nitrogen oxides and the desorbed nitrogen oxides and the desorbed traces of sulfur dioxide are passed through lines 20 and 22 to reactor 24 for subsequent reaction to be described below.

The offgases composed substantially of nitrogen oxides and traces of sulfur dioxide, desorbed in the acid concentrator 26, as well as some steam are then conveyed to the reactor 24 through the overhead lines 20 and 22. To this latter chamber is also conveyed effluent carbon monoxide secured, typically, from the cracking unit of a refinery or as industrial waste fluid from another appropriate source such as described elsewhere herein, and introduced into reactor 24 through the inlet 36. The nitrogen oxides are reduced in contact with the carbon monoxide to form nitrogen and the carbon monoxide converted to carbon dioxide and these resulting products harmlessly released to the surrounding atmosphere through the vent 30. The sulfur dioxide reacts with the carbon monoxide as described hereinafter. This reaction is conveniently undertaken at about 300° to 450° F. using standard procedures well known to those skilled in the art.

That portion of the flue gas not absorbed by the sulfuric acid is recovered as an offgas from the absorber tower 16 and is conducted through the lines 18 and 22 to the reactor 24. This gas, containing normally about 55 wt. % of the $SO_2$ present in the flue gas initially received as effluent and unabsorbed in the tower 16, as well as steam, is contacted, together with recovered carbon monoxide containing effluent introduced by the inlet 36 from an appropriate source as described hereinabove, at a temperature of about 300° to 450° F., and most desirably about 325° F., with a Leak alumina catalyst such as described with respect to the initial catalytic oxidizer 10, that is, illustratively, a copper, nickel or cobalt oxide disposed on alumina which in turn is coated onto a stainless steel wool, or other suitable support. Water as steam and carbon dioxide are emitted from the reactor 24 harmlessly into the surrounding atmosphere by means of vent 30; and sulfur is recovered as a result of the reaction reflected by the following equation: (4):

(4) $2CO + SO_2 \rightarrow 2CO_2 + \frac{1}{2}S_2$

The reduced sulfur is transferred to storage through duct 38.

The reconstituted sulfuric acid after concentration to about 98.0 to 99.5 wt. % $H_2SO_4$ in the acid concentration unit 26 is then in accordance with a preferred embodiment of the invention transmitted as needed to the absorber tower 16 through the feed line 28 for utilization therein. The to be reconstituted acid is diluted with water when necessary to maintain the acid concentration in absorber 16 in the 70 to 90 wt. % range via introduction of water into line 28 from a water line (not shown). Excess reconstituted acid is fed to a storage unit through duct 34. In the preferred embodiment the reconstituted acid which is recycled to absorber 16 is diluted with sufficient water (if needed) to maintain the acid concentration in the absorber in the required between about 70 and 90 wt. % range.

The present invention is further illustrated by the following example.

EXAMPLE

This example illustrates the practice of a continuous process, according to the present invention and employing the apparatus referred to in the accompanying FIGURE.

An emergent flue gas having a temperature of about 900° F. from a power plant unit is first passed through an electrostatic precipitator in which substantially all of the fly ash present is removed. The flue gas is then introduced into a catalytic oxidizer and at this point has a temperature of about 300° F. and a composition including the components and amounts thereof recited in Table I as follows:

TABLE I

| Component | Pounds moles per hour (lb. mole/hr.) |
|---|---|
| $SO_2$ | 367 |
| NO | 102 |
| $NO_2$ | 4 |
| $O_2$ | 7046 |
| $H_2O$ | 15494 |

The catalyst system positioned in conventional manner in the catalytic oxidizer 10 and with which the foregoing flue gas composition transmitted thereto through line 12 is brought into contact is a Leak alumina catalyst, specifically vanadium pentoxide disposed on an alumina-coated steel wool support. Water of the flue gas remains substantially unaffected by this initial oxidation but substantially all of the nitrogen oxides are converted to nitrogen dioxide utilizing the contained oxygen of the flue gas and some of the sulfur dioxide may be converted to sulfur trioxide so that the flue gas as modified and transported through conduit 14 to the absorption tower 16 includes a composition substantially as follows wherein the sulfur trioxide therein is calculated as $SO_2$ for reasons of simplicity:

TABLE II

| Component | Lb. Mole/Hr. |
|---|---|
| $SO_2$ | 367 |
| $NO_2$ | 106 |
| $O_2$ | 6944 |
| $H_2O$ | 15494 |

The absorption tower 16 is of standard construction and provides for countercurrent flow of the modified flue gas and sulfuric acid transmitted thereto from acid concentrator 26 through the duct 28. The sulfuric acid amounting, on an equivalent basis, to about 276 lb. moles/hr. and having a titratable acidity in the range of about 70 wt. % to 90 wt. % $H_2SO_4$; absorbs about 43.5 wt. % of the $SO_2$ of the flue gas, in addition, substantially, to all of the nitrogen dioxide content and substantially all of the sulfur trioxide formed in the catlytic oxidizer 10. This absorption step proceeds at about 250° F., the flue gas heating the sulfuric acid, and the latter cooling the flue gas. There is recovered as an unabsorbed offgas from the absorber about 15,494 lb. moles/hr. of water as steam; and about 208 lb. moles/hr. of $SO_2$. The modified sulfuric acid separately recovered includes about 11.4 lb. moles/hr. of $SO_2$; about 147 lbs. moles/hr. of $H_2SO_4$ and 106 lbs. moles of $HNSO_5$. The offgas containing sulfur dioxide, nitrogen oxides, and steam exiting separately from the absorber 16 is introduced by the inlet ducts 18 and 22 into the reactor 24. The reaction mixture in this chamber has a temperature of about 300° F. Also introduced by line 36 into this reactor 24 is carbon monoxide effluent from a refinery cracking unit to cause the formation of 208 lb. mole/hr. of sulfur, carbon dioxide, nitrogen and water, as steam; the gas mixture containing, carbon dioxide, nitrogen and water being vented to the atmosphere harmlessly by means of the outlet 30. The sulfur is transmitted by conduits 38 to storage.

The sulfuric acid modified as described hereinabove in the tower 16 is transmitted by the duct 32 to the acid concentrator where the water dissolved traces of sulfur dioxide and nitrogen oxides are reduced by desorption, nitrosyl sulfuric acid is decomposed, and the sulfuric acid content increased.

The product mixture of the acid concentrator 26 is recycled to the absorption tower 16.

The foregoing process is particularly advantageous in the relatively high rate of speed at which large volumes of industrial waste fluids and sulfuric acid may be treated. Additionally, in its formation and emission of nitrogen, for example, the instant process treats effluent carbon monoxide while avoiding the necessity of recycling nitrogen oxides to form nitric acid as suggested heretofore. Similarly efficient is the conversion to sulfur of the sulfur dioxide in the unabsorbed industrial waste fluids treated by the process.

It will be evident that the terms and expressions that have been employed herein are used as terms of description and not of limitation. There is no intention in the use of such terms and expressions of excluding equivalents of the features shown and described or portions thereof and it is recognized that various modifications are possible within the scope of the invention claimed.

We claim:

1. In the continuous formation of carbon dioxide, nitrogen, concentrated sulfuric acid and sulfur from an industrial flue gas comprising nitrogen oxides, sulfur dioxide and oxygen, the steps that comprise:

a. contacting at between about 300° and 350° F. said flue gas with a first oxidation catalyst selected from an oxide of a Group Ib, VIa, VIIa or VIII metal of the Periodic Table or an oxide of vanadium at a space velocity of between about 500 and 10,000 volumes of said flue gas/volume of said first catalyst to effect conversion substantially of all the nitrogen oxide in said nitrogen oxides to nitrogen dioxide and to effect conversion of only a part of the sulfur dioxide in said flue gas to sulfur trioxide, b. admixing the oxidized flue gas with between about 70 and 90 wt. % aqueous sulfuric acid to effect adsorption in said sulfuric acid of the nitrogen dioxide in said industrial flue gas and the nitrogen dioxide formed in said step $a$ resulting in the formation of nitrosyl sulfuric acid therein by the reaction of said nitrogen dioxide with sulfuric acid, c. separating the resultant sulfuric acid phase and unabsorbed flue gas phase comprising sulfur dioxide resulting from step $b$, d. heating said sulfuric acid phase separated in step $c$ at between about 300 and 500° F. to remove nitrogen oxides, desorbed sulfur dioxide and water as overhead resulting in a sulfuric acid phase of increased sulfuric acid content and recycling at least a portion of the resultant concentrated sulfuric acid phase to step $b$ to be employed as at least a part of said sulfuric acid, e. combining the overhead formed in step $d$ with the separated unabsorbed flue gas phase of step $c$, and f. treating at a temperature between about 300° and 450° F. the combined unabsorbed flue gas phase and overhead of step $e$ with carbon monoxide in the presence of a second oxidation catalyst selected from an oxide of Group Ib, VIa, VIIa or VIII metal of the Periodic Table or an oxide of vanadium employing a space velocity of between about 500 and 10,000 volumes of said flue gas/volume of said second oxidation catalyst to yield nitrogen, carbon dioxide and sulfur and separating said nitrogen and carbon dioxide from said sulfur.

2. A process according to claim 1 wherein said first oxidation catalyst is vanadium pentoxide.

3. A process according to claim 1 wherein said first oxidation catalyst and said second oxidation catalyst is an oxide of copper.

4. A process according to claim 1 wherein said second oxidation catalyst is an oxide of copper, said second oxidation catalyst being in complex with copper chromite.

5. A process according to claim 1 wherein said first and second oxidation catalysts are deposited upon alumina coated on a support structure of extended surface dimensions.

6. A process according to claim 1 wherein fly ash present in said flue gas is removed therefrom prior to its initial contact with said first oxidation catalyst.

* * * * *